(12) United States Patent
Stiller et al.

(10) Patent No.: US 11,453,402 B2
(45) Date of Patent: Sep. 27, 2022

(54) METHOD FOR DETERMINING THE FATIGUE OF A DRIVER AND APPROPRIATE DEVICE

(71) Applicant: Robert Bosch GmbH, Stuttgart (DE)

(72) Inventors: Benedikt Stiller, Cleebronn (DE); Matthias Rupp, Bad Friedrichshall (DE); Stefan Hoefle, Gemmingen (DE); Valentin Loeffelmann, Dielheim (DE)

(73) Assignee: Robert Bosch GmbH, Stuttgart (DE)

( * ) Notice: Subject to any disclaimer, the term of this patent is extended or adjusted under 35 U.S.C. 154(b) by 389 days.

(21) Appl. No.: 16/676,734

(22) Filed: Nov. 7, 2019

(65) Prior Publication Data
US 2020/0189605 A1 Jun. 18, 2020

(30) Foreign Application Priority Data

Dec. 12, 2018 (DE) ...................... 10 2018 221 542.1

(51) Int. Cl.
*B60W 40/09* (2012.01)
*B60W 50/14* (2020.01)
*G05D 1/00* (2006.01)
*B60W 50/00* (2006.01)

(52) U.S. Cl.
CPC ............ *B60W 40/09* (2013.01); *B60W 50/14* (2013.01); *G05D 1/0088* (2013.01); *B60W 2050/0071* (2013.01); *B60W 2400/00* (2013.01); *B60W 2540/18* (2013.01)

(58) Field of Classification Search
CPC ................. B60W 40/09; B60W 50/14; B60W 2050/0071; B60W 2400/00; B60W 2540/18; B60W 60/0051; B60W 2040/0827; B60W 2520/125; B60W 40/08; B60W 2540/26; G05D 1/0088
See application file for complete search history.

(56) References Cited

U.S. PATENT DOCUMENTS 5,446,660 A * 8/1995 Miichi ..................... B62D 6/00
180/443

FOREIGN PATENT DOCUMENTS

DE 10 2014 219 826 A1 3/2016
DE 102016200973 A1 * 7/2017

* cited by examiner

*Primary Examiner* — Aniss Chad
*Assistant Examiner* — Christine Nguyen Huynh
(74) *Attorney, Agent, or Firm* — Maginot, Moore & Beck LLP (57) ABSTRACT

The present disclosure relates to a method for determining the fatigue of a driver of a motor vehicle, wherein the fatigue is determined while taking into account the steering behavior of the driver, characterized in that the method includes the following steps: determination of a hysteresis of the steering system or the fatigue detection system, and taking into account the detected hysteresis in the determination of the fatigue of the driver. Furthermore, the disclosure relates to a device that is set up to execute the method.

11 Claims, 6 Drawing Sheets

METHOD FOR DETERMINING THE FATIGUE OF A DRIVER AND APPROPRIATE DEVICE

This application claims priority under 35 U.S.C. § 119 to application no. DE 10 2018 221 542.1, filed on Dec. 12, 2018 in Germany, the disclosure of which is incorporated herein by reference in its entirety.

TECHNICAL FIELD

The present disclosure relates to a method for determining the fatigue of a driver of a motor vehicle, wherein the fatigue is determined while taking into account the steering behavior of the driver, characterized in that the method includes the following steps: determining a hysteresis of the steering system or fatigue detection system, and taking into account the detected hysteresis in the determining the fatigue of the driver. Furthermore, the disclosure relates to a device that is set up to execute the method.

BACKGROUND

Patent application DE 10 2014 219 826 A1 is well-known from the prior art, for example. This document concerns a procedure for determining the state of fatigue of a driver of a vehicle, in particular a motor vehicle, which has a steering device that can be operated by a driver, wherein the steering device is monitored for steering movements caused by the driver, and wherein the driver's fatigue is determined depending on at least one recorded steering movement.

Attention detection for drivers of a motor vehicle—or fatigue detection—is often based on steering angle. Throughout, the terms fatigue and attention, or detection/determination of fatigue and attention of the driver shall be used synonymously. However, a steering system has faults and tolerances. A decisive error in the steering angle signal is the hysteresis. This significantly influences the detection of fatigue. Currently, a hysteresis in the steering angle signal is not taken into account when calculating fatigue. Due to deviations in production or aging of the steering system, different hysteresis values are produced. The fatigue detection algorithm is applied based on a driving set in which the steering angle signal in the vehicle has a specific hysteresis. In the field, various hysteresis subsequently occur in series. Fatigue detection performance changes depending on hysteresis.

SUMMARY

Advantageously, however, the method according to the disclosure allows an improvement of fatigue detection. This is made possible by the features according to the disclosure. Further embodiments are also the subject matter of the disclosure.

The method according to the disclosure for determining the fatigue of a driver of a motor vehicle, wherein the fatigue is determined taking into account a steering behavior of the driver, is characterized in that the method includes the following steps: Determination of a hysteresis of the steering system or the fatigue detection system, and taking the detected hysteresis into account in the determination of the fatigue of the driver.

This means that the actual and current hysteresis is determined during the operation of the vehicle and is taken into account in the determination of the fatigue of the driver. This can be taken into account, for example, in a direct way when calculating fatigue or indirectly, for example by adjusting signals or parameters in advance of the calculation of fatigue.

Advantageously, a loss of performance of the steering angle-based fatigue detection in the event of hysteresis in the steering angle signal can be avoided. Furthermore, it is enabled that no deviation of the performance of different vehicles in the field occurs. A deviation in performance in the event of ageing of the vehicles or components is also avoided. This enables reliable fatigue detection over the life of the vehicle, for example. Advantageously, requirements regarding hysteresis in the steering angle signal for a functioning fatigue detection can be minimized. This leads to a reduction in hardware costs for steering systems.

In an advantageous embodiment, the method is characterized in that the determination of the hysteresis takes place in at least one of the following areas:
Steering mechanism,
Steering angle sensor measuring system,
Steering angle sensor preprocessing,
Signal transmission
Control unit input,
Fatigue detection.

This means that in one or more of the above areas the hysteresis occurring during operation of the vehicle is determined. Depending on the area, one or more different components may be responsible for the occurrence of hysteresis. Accordingly, one or more components are analyzed. For example, hysteresis often occurs in the measuring system of the steering angle sensor. This hysteresis can lead to an error in determining fatigue. Therefore, for example, the actual hysteresis in the measuring system of the steering angle sensor is determined and taken into account. Advantageously, optimization of the quality of the result is achieved in this way. Furthermore, the costs required are kept to a minimum by the causation-related limitation of the monitoring.

In a possible embodiment, the method is characterized in that the determination of hysteresis includes the process step: determination of a steering angle signal. This means that the steering angle signal curve is recorded to determine the hysteresis.

In a preferred embodiment, the method is characterized in that the determination of the hysteresis includes the step of the method: analysis of a steering angle signal. This means that the steering angle signal curve is evaluated to determine the hysteresis. Advantageously, an already determined steering angle signal curve can be used and evaluated. Alternatively, the detection of the steering angle signal is carried out exclusively for the determination of hysteresis.

In an alternative development, the method is characterized in that the analysis of the steering angle signal includes at least one of the steps of the method: determination of at least one position in the steering angle signal at which a hysteresis has occurred, calculation of the hysteresis at the at least one determined position.

This means that the position in the steering angle signal curve is estimated at which a hysteresis occurred, or probably occurred. For example, such a position is assumed on a plateau plane in the steering angle signal curve. The actual hysteresis is estimated or calculated at this exact position of the estimated hysteresis. For example, at a defined time in the steering angle signal curve, the steering angle actually provided by the driver is estimated. Strictly speaking, the difference between the steering angle signal determined by the sensor and the steering angle actually provided by the driver is determined. Different approaches are available for the calculation.

In a possible embodiment, the method is characterized in that the calculation of the hysteresis includes the following steps of the method:
Applying two tangents to the steering angle signal curve
Determination of the intersection of the two tangents
Calculation of the hysteresis based on the steering angle signal curve and the intersection of the two tangents, in particular calculation of the hysteresis of the total signal as twice the distance between the intersection of the tangents and a plateau of the steering angle signal curve.

This will describe a first approach to the determination of the hysteresis. In this way, for example a tangent is applied to the last point of the steering signal curve before a plateau plane. The slope of the tangent is determined by this point and another point of the steering signal curve, for example the point of the steering signal curve that is at a distance of two time units before the last point. This allows an average value for the slope of the signal curve at said point to be estimated. The distance between the intersection of both tangents and the plateau is the hysteresis error and corresponds to half the hysteresis of the total signal (since deviations occur on both positive and negative plateaus). The course of the tangents in the vicinity of the plateau corresponds to an approximation of the true steering angle of the driver.

In a possible implementation, the method is characterized in that the determination of the hysteresis takes into account the following signals:
a steering angle signal,
a lateral acceleration signal, in particular a turn rate, of the vehicle,
wherein the determination of hysteresis is carried out in particular taking into account a direct relationship between the steering angle signal and the lateral acceleration of the vehicle.

This will describe a further approach to the determination of the hysteresis. In addition to the steering angle signal, another signal is evaluated and taken into account. In the example given, this is the vehicle's lateral acceleration signal. This means that the relationship between the steering angle signal and the lateral acceleration or the turn rate is used to calculate a currently present hysteresis value. Accordingly, again, a determination of the steering angle signal or the use of an already existing steering angle signal takes place. Also, a determination of the lateral acceleration is carried out or an already existing lateral acceleration signal, for example from the ESP control unit or corresponding sensors, is used.

In a preferred development, the method is characterized in that at least one of the following steps of the method is carried out while taking into account the determined hysteresis:
Adaptation of an application parameter of the fatigue determination,
Adaptation of the dead band event intensity of the fatigue determination,
Changing the hysteresis in the steering angle signal to a known value.

This means that there is a variety of options to take into account the detected hysteresis when determining driver fatigue. Three options are explicitly named. With the help of the performance change curve for occurring hysteresis, for example, application parameters or the dead band event intensity can be adjusted. Alternatively, the hysteresis in the steering angle signal can be changed to a known value. This counteracts a loss of performance. Each option can be used individually to optimize the fatigue detection. However, several or all options can be used for this purpose.

In an alternative embodiment, the method is characterized in that a driver assistance system is controlled based on the determined fatigue, in particular in that one of the following steps of the method is carried out based on the determined fatigue: issuing a warning to the driver, taking over control of the vehicle by an automated driving function.

This means that further steps of the method to increase road traffic safety are advantageous following the determination of fatigue or inattention of the driver. For example, an audible and/or visual and/or haptic warning can be issued to the driver. Alternatively or in addition, or in a next assistance step, control of the vehicle can be taken over by an automated driving function if driver fatigue has been detected. This automated driving function may provide for the vehicle to be removed from the traffic situation as soon as possible and brought into a safe, parked condition.

This method can be implemented, for example, in software or hardware or in a mixture of software and hardware, for example in a control unit.

The approach presented here also provides a device that is designed to carry out, control or implement the steps of a variant of a method presented here in appropriate devices. In addition, the object of the disclosure can be achieved quickly and efficiently by this version of an embodiment of the disclosure in the form of a device.

A device can be understood in the present case as an electrical device that processes sensor signals and, depending thereon, outputs control and/or data signals. The device may comprise an interface that can be embodied in hardware and/or software. In a hardware form, the interfaces can be, for example, part of a so-called system ASIC, which includes various functions of the device. However, it is also possible that the interfaces are separate, integrated circuits or at least partly consist of discrete components. In a software form, the interfaces can be software modules, which are present, for example, on a microcontroller alongside other software modules. A device should continue to be understood as a fatigue detection system or part thereof, for example a control unit. Furthermore, a correspondingly designed driver assistance system or a part thereof can be understood as a device.

Also of advantage is a computer program product or computer program with program code, which can be stored on a machine-readable carrier or storage medium such as a semiconductor memory, a hard disk memory or an optical memory and which can be used for execution, implementation and/or control of the steps of the method according to one of the embodiments described above, in particular when the program product or program is executed on a computer or a device.

BRIEF DESCRIPTION OF THE DRAWINGS

It should be noted that the features individually listed in the description can be combined in any technically reasonable manner and reveal further embodiments of the disclosure. Further features and usefulness of the disclosure arise from the description of exemplary embodiments on the basis of the attached figures.

In the figures.

DETAILED DESCRIPTION

Figure 1:
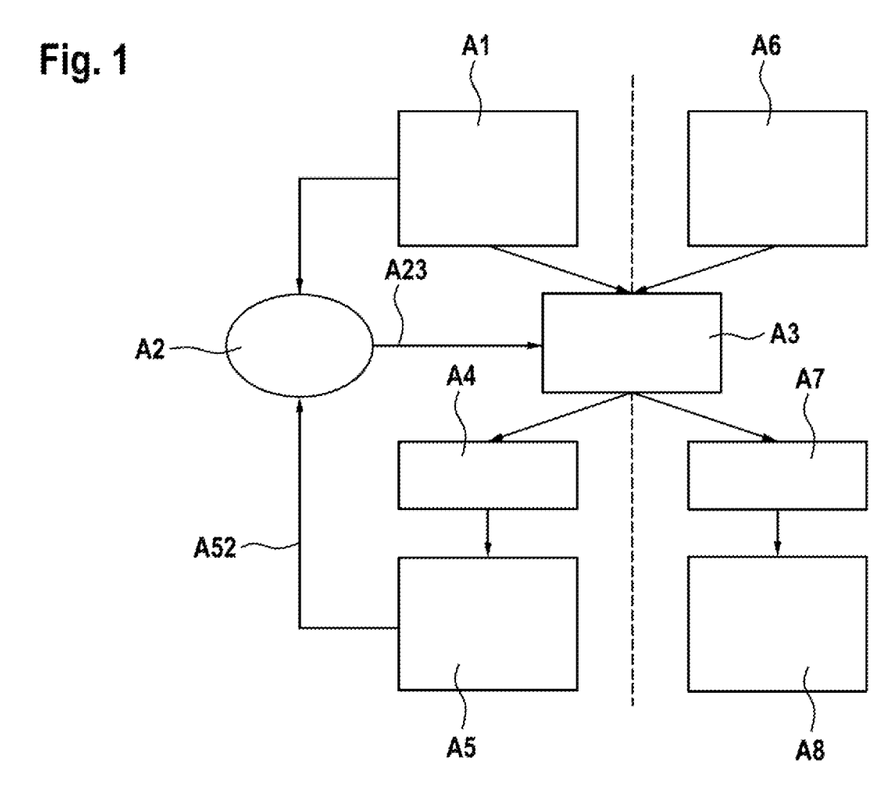
FIG. 1 shows a procedure of an application process of fatigue detection from the prior art.

FIG. 1 shows a procedure of an application process of fatigue detection from the prior art. Here, the application is carried out with a test vehicle that has a certain hysteresis (left half of the image). However, different hysteresis can occur in the field, which can change the warnings and thus the performance of the fatigue detection (right half of the image). A1 shows the test vehicle with an unknown hysteresis in the steering angle signal. In A2, the application is carried out. Based on this, in A23 parameters are defined and transferred to the fatigue detection process in A3. In A4, the warnings are optimized and adjusted. This is carried out up to A5 until sufficient performance, i.e. reliability, is present in the test vehicle. The stored values are taken into account as target values in A52 in the application. In the field, however, there are other vehicles with different hysteresis in the steering angle signal A6. However, these also use the fatigue detection process A3 with the stored parameters. This may cause time delays in the event of a warning A7. Furthermore, there may be a change in performance A8.

Figure 2:
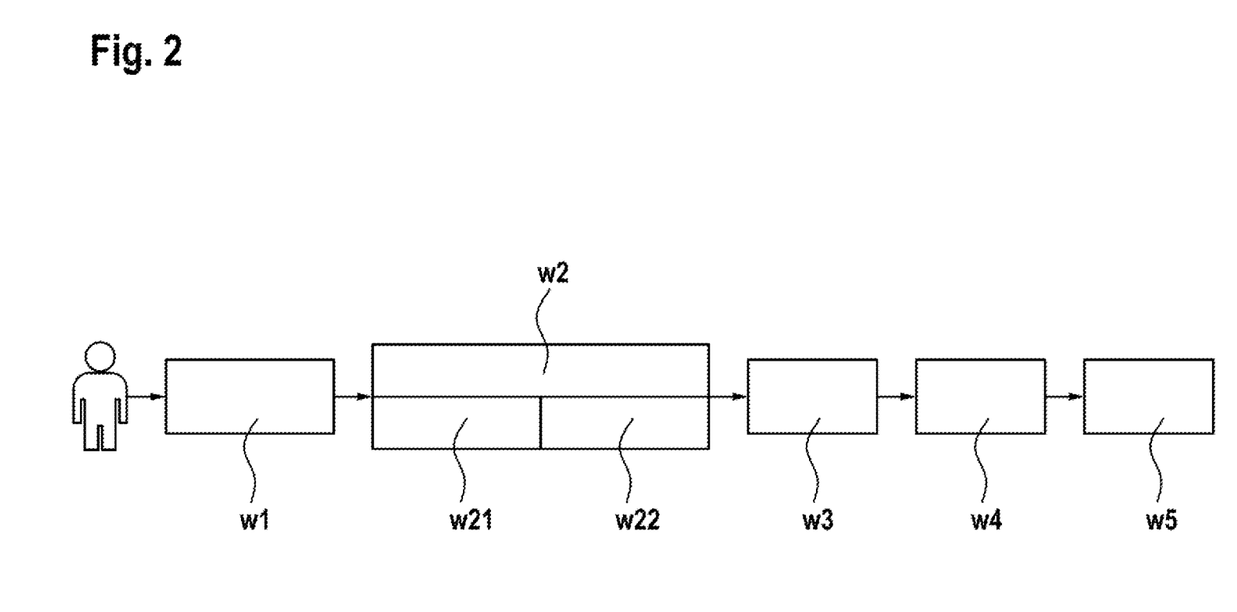
FIG. 2 shows an action chain of the steering angle signal from the driver to the fatigue detection.

FIG. 2 shows a chain of action of the steering angle signal from the driver to the fatigue detection. In this case, hysteresis errors can occur in each individual element. The main source of error, however, is mostly the measuring system of the steering angle sensor. For example, the chain of action starts with the driver, who caused a lane change due to a movement of the steering wheel. The first component w1 in the chain of action is the steering mechanism. The next component w2 is the steering angle sensor. This consists of the measuring system w21 as well as the preprocessing w22. Both components may also have a hysteresis error. This is followed by signal transmission w3, control unit input w4 and fatigue detection w5. Here, too, hysteresis can be present in each individual component or all components, which can lead to an error in the evaluation or at least a reduction in performance.

Figure 3:
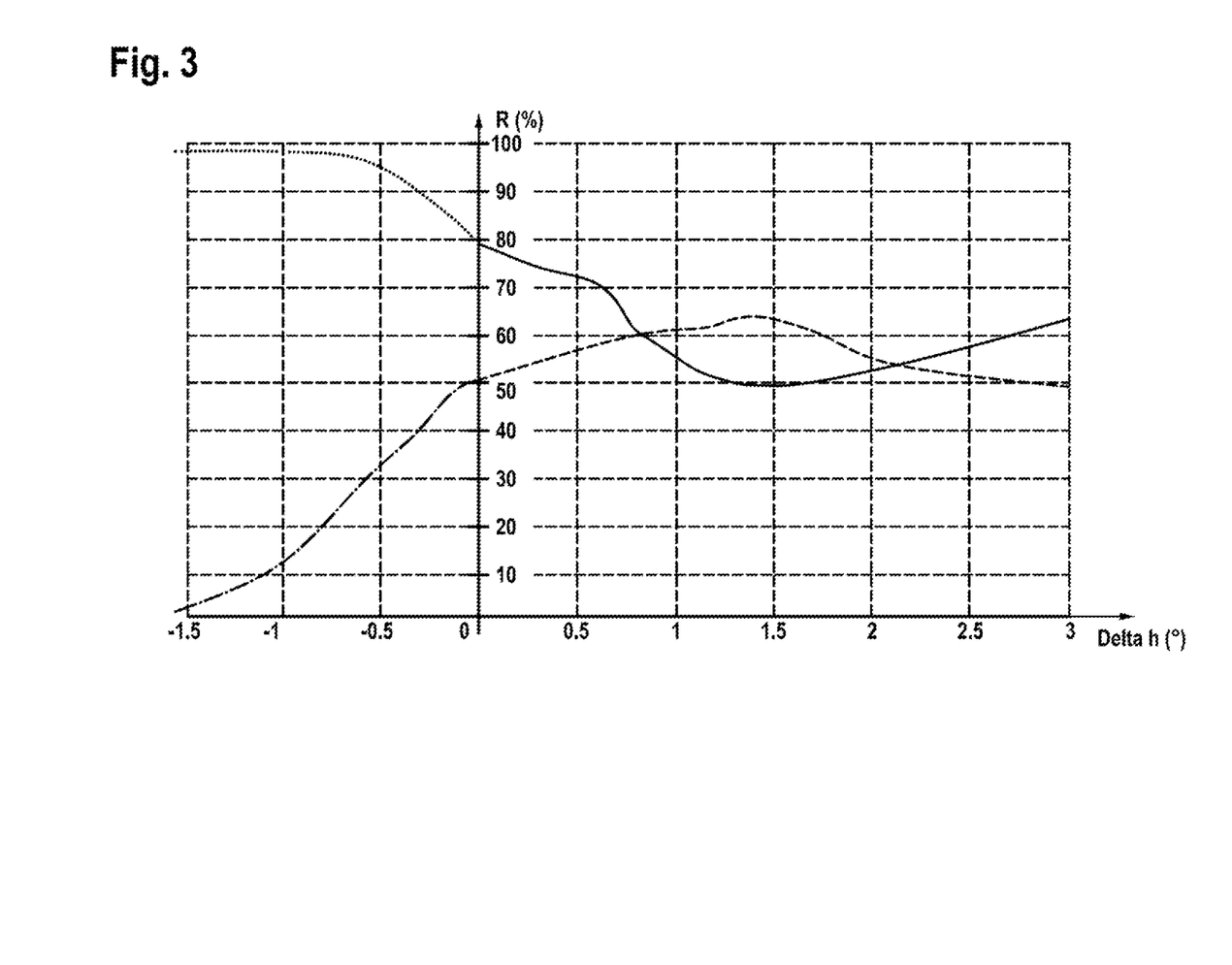
FIG. 3 shows a representation of the performance change in the case of hysteresis differences in the steering angle signal.

FIG. 3 shows a representation of the performance change in the event of hysteresis differences in the steering angle signal. The performance change is shown on the basis of the relevant parameter specificity (correct-negative rate) and sensitivity (correct-positive-rage) in the case of hysteresis differences. The x-axis shows the hysteresis differences in degrees and the y-axis shows the ratio in percentages. The solid line (or dotted line) shows the specificity parameter and the dashed line (or dashed dotted line) shows the parameter sensitivity.

Figure 4:
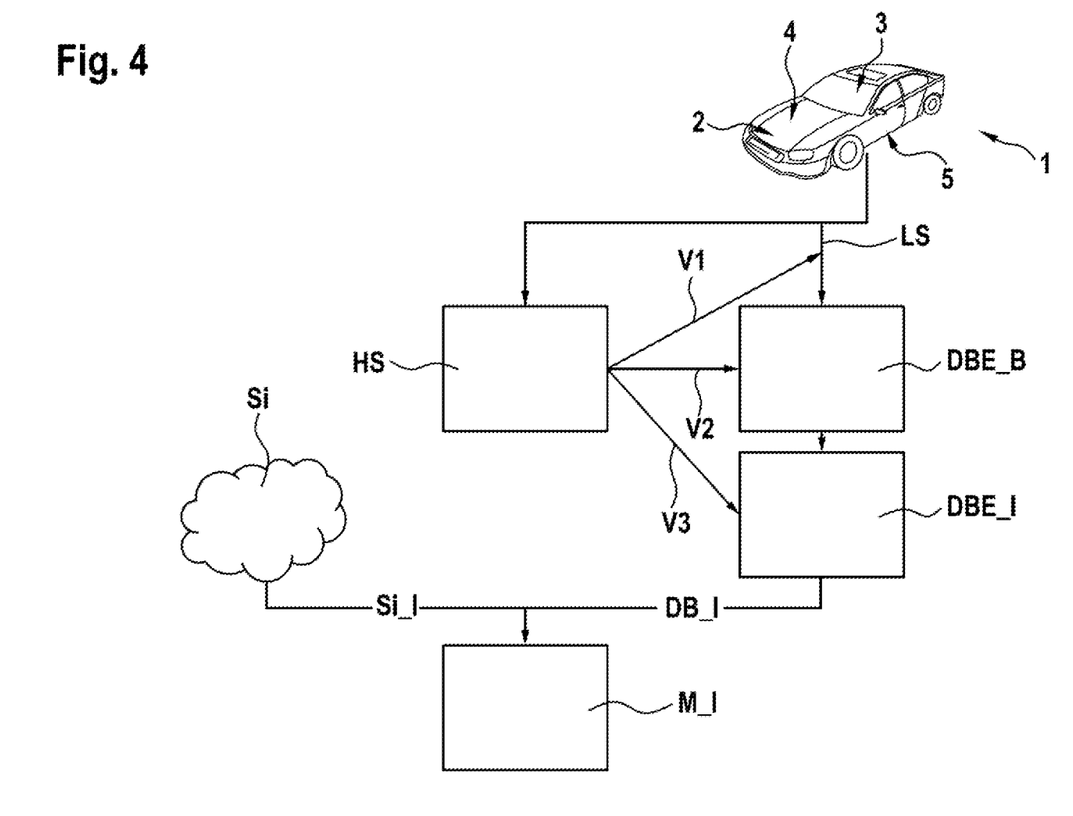
FIG. 4 shows possible measures against performance change in the case of fatigue detection.

FIG. 4 shows possible measures against a change in performance occurring in the case of hysteresis using the example of a fatigue detection. With the help of a hysteresis estimator, which calculates the hysteresis online in the vehicle, various measures can be taken that keep the performance constant. The vehicle 1 includes a steering system 2 and a fatigue detection system 3, and furthermore a driver assistance system 4. Also shown is a control unit 5, which may be assigned to the driver assistance system 4 and/or the fatigue detection system or the steering system 2. During the operation of the vehicle, the steering angle signal (with existing hysteresis) is evaluated. The determination of the hysteresis is carried out by the hysteresis estimator HS. Based on the hysteresis thus determined, several measures can be performed. In measure V1, the hysteresis in the steering angle signal is changed. If the steering angle signal is corrected with a changed hysteresis, the dead band event calculation does not change. In the measure V2, the application parameters are changed. If the application parameters are changed, a changed dead-band event calculation (DBE_B) can be counteracted. In the measure V3, the dead band event intensity is changed. When the dead band event intensity (DBE_I) is changed, individual dead band events have a different influence on the dead band index. A change in the dead band event calculation may be relativized thereby. The dead band index (DB_I) is calculated while taking into account the selected measure(s). Furthermore, the situation index (Si_I) is determined on the basis of the current situation (Si). The determination of the fatigue index (M_I) is then carried out taking into account the dead band index (DB_I) and the situation index (Si_I).

Figure 5:
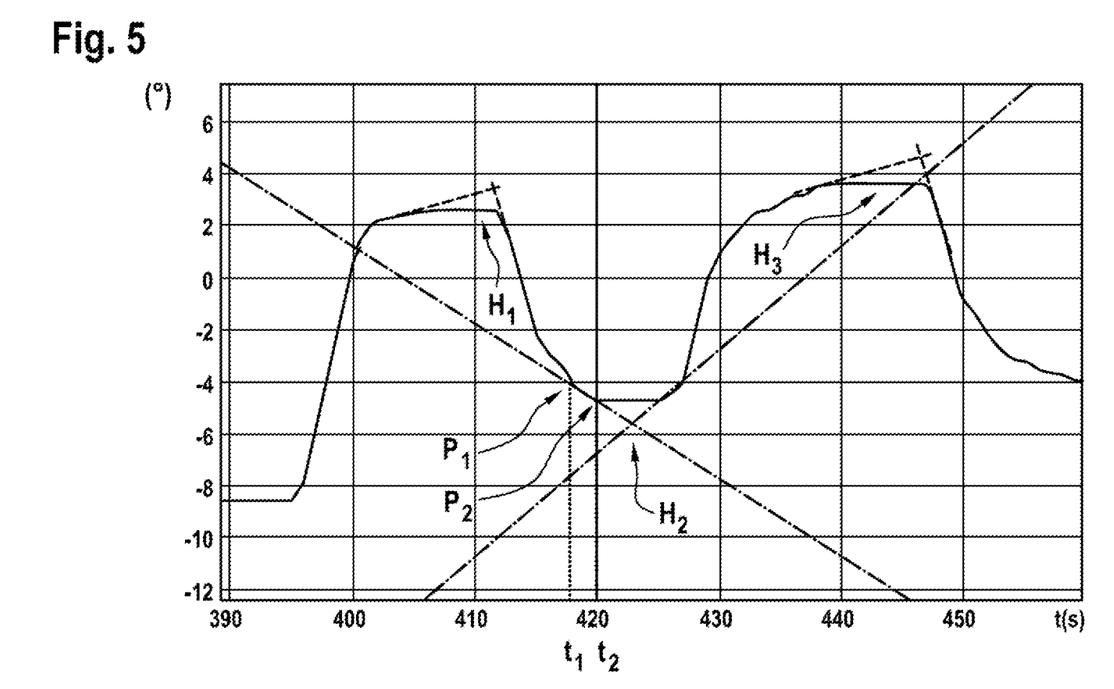
FIG. 5 shows a presentation of an exemplary determination of hysteresis.

FIG. 5 shows a representation of an exemplary approach to the determination of the hysteresis. Here, the steering angle signal curve is shown against time. For the calculation of the hysteresis, the past steering angle signal (solid line) is analyzed at positions where hysteresis occurred. Then, at these positions, the hysteresis ($H_1, H_2, H_3$) is calculated using two tangents (dotted-dashed line). The course of the tangents in the area of the plateau corresponds to an approximation of the true steering angle of the driver.

For the tangents, on the one hand the last point $P_2$ before the plateau and in addition another point $P_1$ are used for the tangent slope. This additional point $P_1$ is at a distance of two time units to get an average value for the slope. Since the hysteresis occurs in the entire steering angle signal, the tangents are applied to each occurring plateau. The distance between the intersection of both tangents and the plateau is the error and corresponds to half the hysteresis of the total signal (since deviations occur with both positive and negative plateaus). The distances between the intersections and the plateau will be very identical with this calculation method, so that an average of all distances hits (half) the hysteresis of the signal very precisely. Examples are shown of three hysteresis $H_1, H_2$ and $H_3$.

Figure 6:
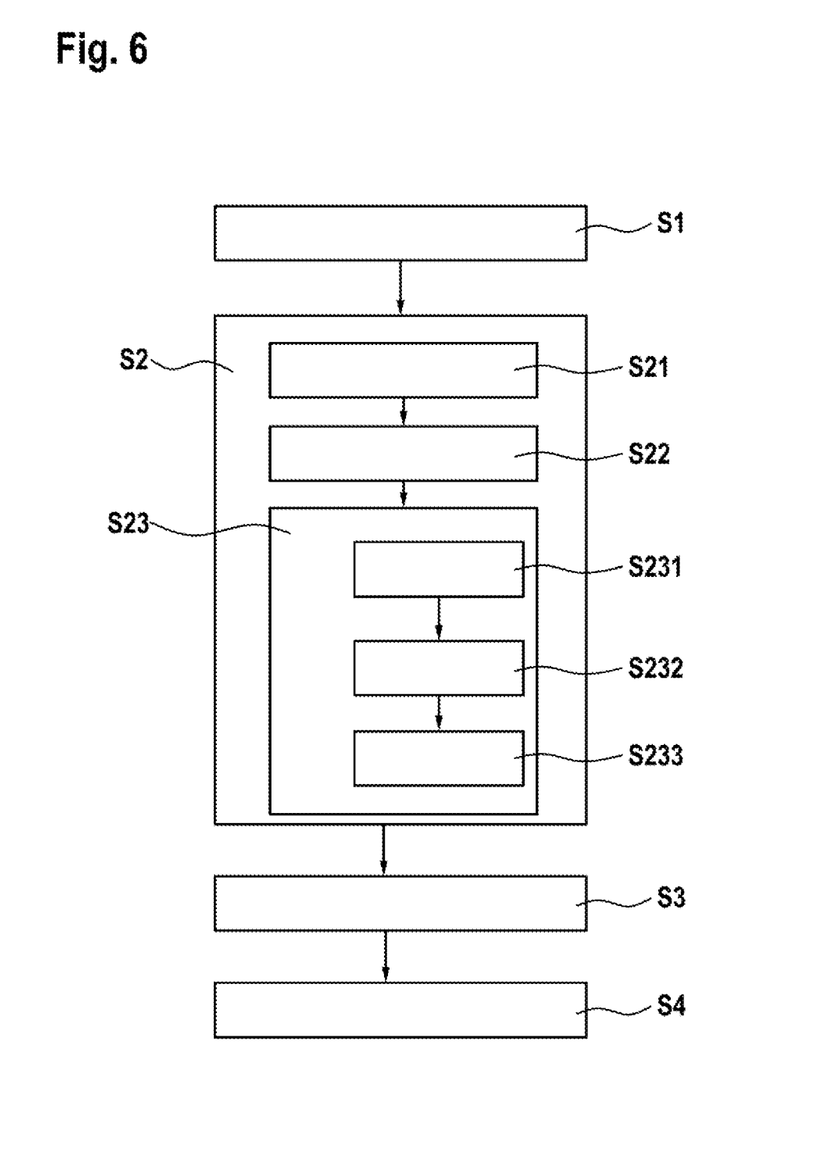
FIG. 6 shows exemplary steps of the method for the determination and consideration of hysteresis in the case of fatigue detection.

In FIG. 6, a representation of the steps of the method of an embodiment of the disclosure is shown. In a first step S1, the procedure is started. Step S2 shows the determination of the hysteresis. To determine the hysteresis, the steering angle signal is first determined in S21. In S22, the positions in the steering angle signal at which hysteresis occurred are determined. In step S23 the calculation of the hysteresis is carried out. For this purpose, two tangents are applied to the plateaus of a respective hysteresis in a step S231. In step S232, the intersection of the tangents is calculated. In step S233, the respective hysteresis is determined on the basis of the distance of the tangent intersection point and the plateau. In step S3, a measure is performed to reduce the hysteresis error. In step S4, a fatigue determination is carried out while taking into account the optimization to reduce possible errors on the basis of detected hysteresis.

What is claimed is:

1. A method for determining a fatigue of a driver of a motor vehicle, the method comprising:

determining a hysteresis of at least one of (i) a steering system and (ii) a fatigue detection system, based on a direct relationship between a steering angle signal and a lateral acceleration signal indicating a turn rate of the vehicle;

determining the fatigue of the driver based on a steering behavior of the driver and the determined hysteresis; and controlling a driver assistance system to take over control of the motor vehicle with an automated driving function based on the fatigue of the driver.

2. The method according to claim 1, the determining the hysteresis further comprising:

determining the hysteresis based on at least one of (i) a steering mechanism, (ii) a steering angle sensor measuring system, (iii) a steering angle sensor preprocessing, (iv) a signal transmission, (v) a control unit input, and (iv) the determining of the fatigue of the driver.

3. The method according to claim 1, the determining the hysteresis further comprising:

receiving the steering angle signal.

4. The method according to claim 3, the determining the hysteresis further comprising:

analyzing the steering angle signal.

5. The method according to claim 4, the analyzing the steering angle signal further comprising:

determining at least one position in the steering angle signal at which a hysteresis has occurred; and calculating the hysteresis at the at least one position.

6. The method according to claim 5, the calculating the hysteresis further comprising:

applying two tangents to a curve of the steering angle signal;

determining an intersection of the two tangents; and calculating the hysteresis as twice a distance between the intersection of the two tangents and a plateau of the curve of the steering angle signal.

7. The method according to claim 1 further comprising at least one of:

adapting, based on the determined hysteresis, an application parameter that is used to determine the fatigue of the driver adapting, based on the determined hysteresis, a dead band event intensity that is used to determine the fatigue of the driver; and changing, based on the determined hysteresis, a hysteresis in a steering angle signal to a known value.

8. The method according to claim 1 further comprising:

controlling the driver assistance system: to issue issuing a warning to the driver based on the fatigue of the driver.

9. A device for determining a fatigue of a driver of a motor vehicle, the device configured to:

determine a hysteresis of at least one of (i) a steering system and (ii) a fatigue detection system, based on a direct relationship between a steering angle signal and a lateral acceleration signal indicating a turn rate of the vehicle;

determine the fatigue of the driver based on a steering behavior of the driver and the hysteresis of the at least one of (i) the steering system and (ii) the fatigue detection system; and control a driver assistance system to take over control of the motor vehicle with an automated driving function based on the fatigue of the driver.

10. The device according to claim 9, wherein the device is configured to execute a computer program to determine the hysteresis and to determine the fatigue of the driver.

11. The device according to claim 9, wherein the computer program is stored on a machine-readable storage medium.

* * * * *